United States Patent [19]

Miller

[11] 4,058,083

[45] Nov. 15, 1977

[54] REAR BATTER FLOW FOR BATTER APPLICATOR MACHINES

[75] Inventor: Michael E. Miller, Bellevue, Ohio

[73] Assignee: Sam Stein Associates, Inc., Sandusky, Ohio

[21] Appl. No.: 659,776

[22] Filed: Feb. 20, 1976

[51] Int. Cl.² ........................... B05C 3/10; B05C 5/00
[52] U.S. Cl. ........................................ 118/16; 118/24; 118/30
[58] Field of Search ..................... 118/16, 24, 30, 304, 118/324

[56] References Cited

U.S. PATENT DOCUMENTS

| 2,081,888 | 5/1937 | Birdsall | 118/16 |
| 3,045,640 | 7/1962 | Hill et al. | 118/16 |
| 3,596,633 | 8/1971 | Porter et al. | 118/16 |
| 3,759,218 | 9/1973 | Korstvedt | 118/24 X |
| 3,885,519 | 5/1975 | Orlowski | 118/16 |

Primary Examiner—John P. McIntosh
Attorney, Agent, or Firm—Baldwin, Egan, Walling & Fetzer

[57] ABSTRACT

Apparatus is disclosed for coating the under side of a food product with a batter material of intermediate viscosity so as to eliminate substantially all bare spots.

10 Claims, 6 Drawing Figures

REAR BATTER FLOW FOR BATTER APPLICATOR MACHINES

BACKGROUND OF THE INVENTION

In the field of large scale production of battered and breaded food products, one frequent problem is the formation of bare spots on the under side of generally flat food shapes such as sawed frozen fish portions, meat patties, and the like. Conveying means through the batter applicator usually consists of an open mesh wire conveyor belt which receives the spaced and oriented product pieces from a feed conveyor, conveys them slightly downward into a shallow batter-filled pan for bottom coating and under a falling curtain of batter for top coating, then conveys them out of the pan and under an air curtain for excess batter removal before discharging them to the breading machine, after which the belt returns under the shallow pan to the feed area. Most such batters are of such low viscosity that little is adhering to the wires of the belt when the product is first received. Then, when the belt dips into the shallow pan, occasional air bubbles are trapped by the wires against the under side of the product, are carried with the product through the shallow pan, and prevent the batter from wetting the bubble area. When the product is not battered, it will not pick up breading in the breading machine, and the resulting bare spot causes the piece to be rejected by quality control inspectors. In some cases, bare spots cause the rejection of thousands of pieces per day, to be reworked or to be packed as lower grade.

The present invention practically eliminates the problem described above by preventing the formation and trapping of air bubbles, hence the formation of bare spots. The feed area of the open mesh wire conveyor belt, both product advancing run and return run, is utilized to form a sheet or layer of batter in the product receiving area of the belt, the sheet actually extending from the surface of a conveyor slide plate to slightly above the level of the conveyor wires. Thus, when the product transfers from the product feed conveyor to the batter applicator fitted with this invention, the product first touches batter before touching conveyor wires, and as the product feeds on to the batter applicator conveyor, the continual formation of the batter sheet under the product insures that the entire under surface is wetted with batter while all the bubbles are expelled.

It may be noted that some batter applicators, called in the trade "tempura", afford a wet surface for receiving the product. In this case, the tempura batter is of such high viscosity that the return run of the applicator belt drags a continuous sheet of tempura material out of a lower storage hopper and around a belt pulley to a belt slide plate. The present invention is not necessary in such cases, but the tempura batter applicator will not form the wet receiving surface if used with the low viscosity batters which are used with the present invention. The present invention thus serves a different need than does the tempura applicator.

It may be also noted that bottom surface coverage could be obtained by dropping the product pieces edgewise into a pool of batter, onto a fully submerged conveyor, then arranging the product carrying run of the conveyor to lift the product out of the pool for excess batter removal and discharge to further processing. The objection to this method is the probability of severe product disorientation, so that the product pieces are touching or even overlapping when removed from the pool. Such disorientation will result in no breading application on areas where pieces touch each other, which is little better than the originally discussed problem. The present invention maintains essentially the same product orientation in the batter applicator as that in the feed conveyor to the applicator.

In the drawings,

FIG. 5 is a plan view of a portion of the wire belt conveyor shown in the present embodiment; while

Figure 1:
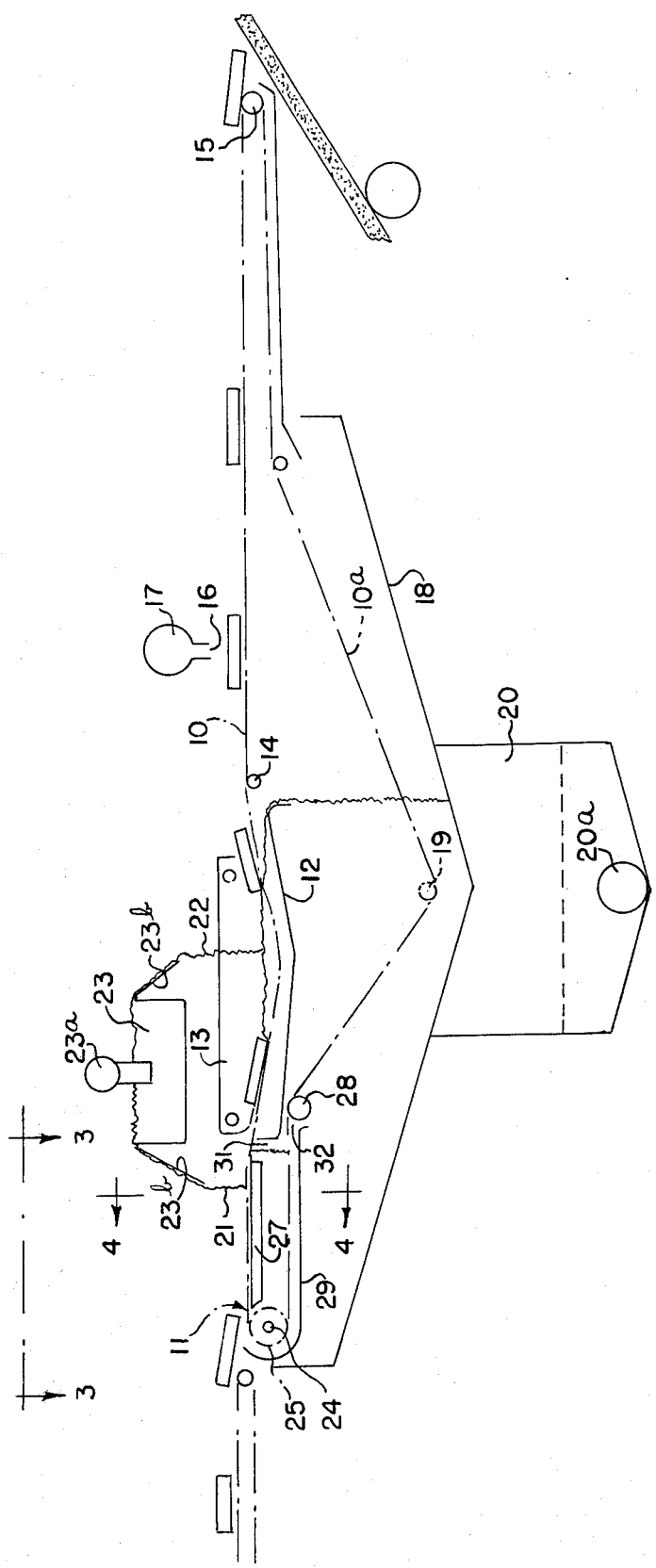
FIG. 1 is a longitudinal view showing a section of a standard batter applicator with the addition of the rear batter flow mechanism of the present invention.

Referring to FIG. 1, parts of a typical configuration for a batter applicator may be understood. A product belt 10 of open mesh wire construction is usually driven at the product infeed end 11 of the unit so that the large belt driving sprockets are not in the discharge area where a small diameter pulley is preferred. As the belt leaves the drive sprockets, it usually has a short horizontal section, not shown here, sometimes supported underneath by slide bars not shown, then it passes over a transverse cross rod for support and directional change. The belt then dips at a slight angle into a batter puddle pan 12, forced down by belt hold down plates 13 at both edges of the belt which are formed to the desired belt dip shape extending below the level of the batter in the reservoir. Upon rising from the puddle pan, the belt passes over another cross rod 14 for support and directional change, thence horizontally again to the nose pulley 15. This horizontal section is always supported by slide bars, not shown, under the belt and is long enough to reach into the proper area of the breading applicator. While the product is on this horizontal section, excess batter is blown off the top by an air curtain 16 above the product. The curtain usually consists of a slotted pipe 17 as shown, adjustable in height above the product, blinded at one end and supplied by an air blower, not shown, at the other end. The nose pulley 15 is of small diameter so that product may be transferred to breading with as little dropping action as possible. The belt 10 now makes an 180° turn around the nose pulley to the return run 10a, again horizontal, until it is beyond the drip pan under the belt, where it again passes over a cross rod for support and directional change. The return run dips down near the bottom of the main batter tank 18, under another cross rod 19, and returns to the drive shaft. All of the above mechanism may be mounted on a conveyor frame which fits into the main batter tank but which can be wholly removed, or may be rotated upward about the drive shaft, for cleaning. The cross rods described may be rollers or pulleys, but this is usually not necessary. The battle puddle pan 12 is usually mounted so that the depth of the puddle may be controlled. In order to avoid floating of the product, and hence disorientation of the product, the puddle must usually be of less depth than the product height, but there should be sufficient depth to insure batter coverage on the edges of the product. Depth is adjusted by operating personnel for each particular product by means not shown. It may be noted that the product carrying run of the belt is the slack side, being downstream of the drive shaft, therefore the belt conforms better to the shape of the belt hold down 13 than it would if driven from the nose pulley.

The shape of the main batter tank is not too important, but the bottom is usually sloped downwardly from both ends to the middle as shown. This permits all excess batter to drain to a relatively small sump 20 so that batter quantity can be kept to a minimum, if desired, and still supply the batter circulating pump suction. In some cases, the return run of the belt follows the tank bottom closely. This is done when a large supply of batter is kept in the tank, so that the belt assists in keeping the batter stirred and mixed.

The top covering of the batter is applied by passing the belt under one or more transverse falling curtains 21, 22 of batter. The overflow trough 23 shown is typical. A batter pump, not shown, takes suction from the bottom of the batter sump 20a and discharges into one end of the batter feed manifold 23a, the other end of the manifold being blinded. A series of short open ended tubes on the underside of the manifold deliver the batter to a number of points in the length of the batter overlow trough, which is transverse to the product belt run and has blind ends. The pump discharge is valve controlled so that the curtain or curtains attain the thickness and shape desired. The sloping wings 23b of the batter trough afford a reasonably sharp edge for the curtain to leave in falling, to insure that the curtain is continuous across the width of the belt 10.

It may now be seen how the product is coated on both sides in a typical known batter application. Product pieces are gently and evenly transferred from a feed conveyor to the batter applicator belt. Product then follows the belt down into a batter puddle where the bottom is coated, while a falling curtain of batter floods the top. Partial immersion in the puddle plus overflow from top flooding insures that product sides are fully coated. The product then moves out of the puddle, excess batter drips off the bottom and excess is blown off the top. Then the product is gently transferred to the breading applicator.

Figure 2:
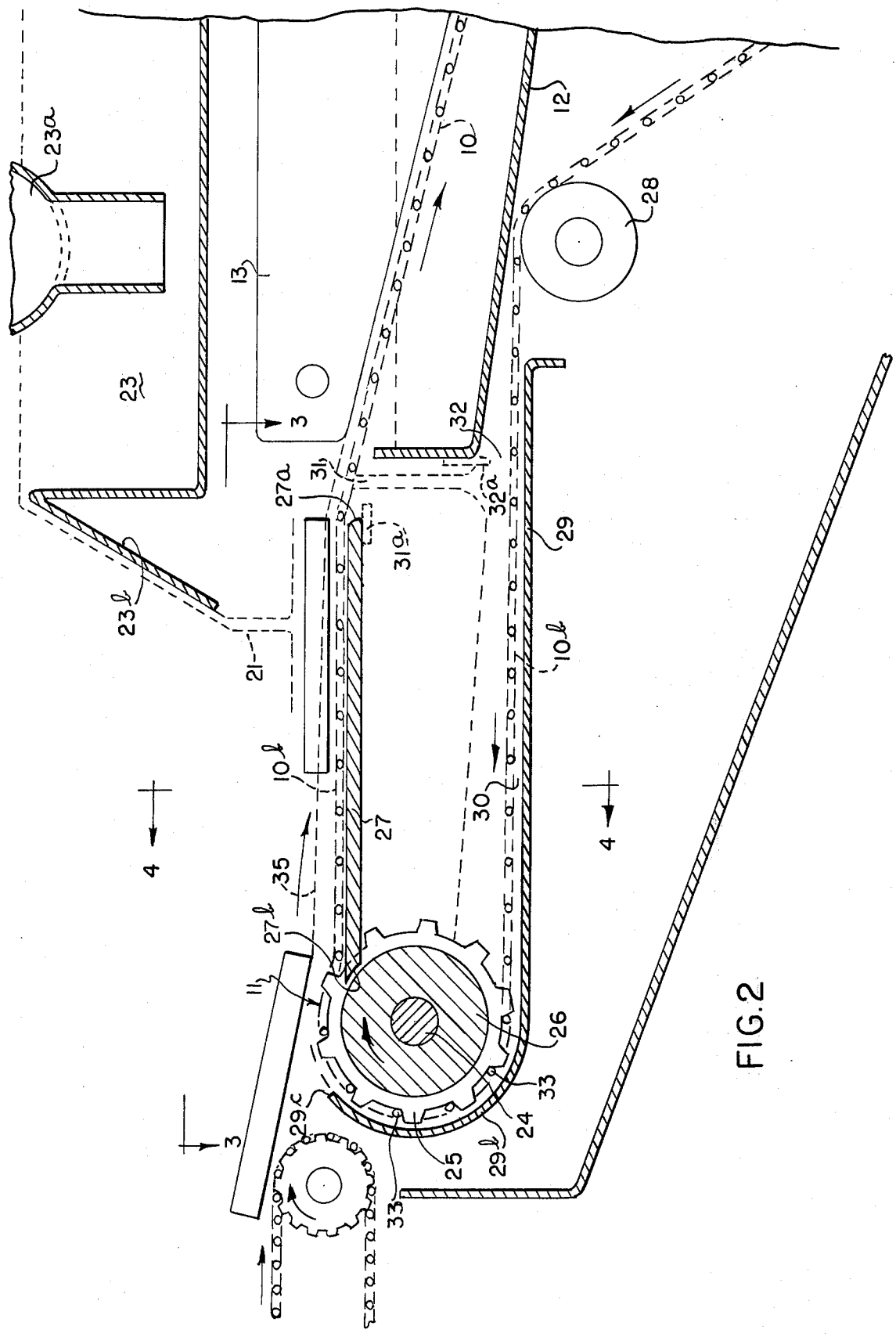
FIG. 2 is an enlarged sectional view of the left end of FIG. 1, showing the structure of the rear batter flow components of this invention.
Figure 3:
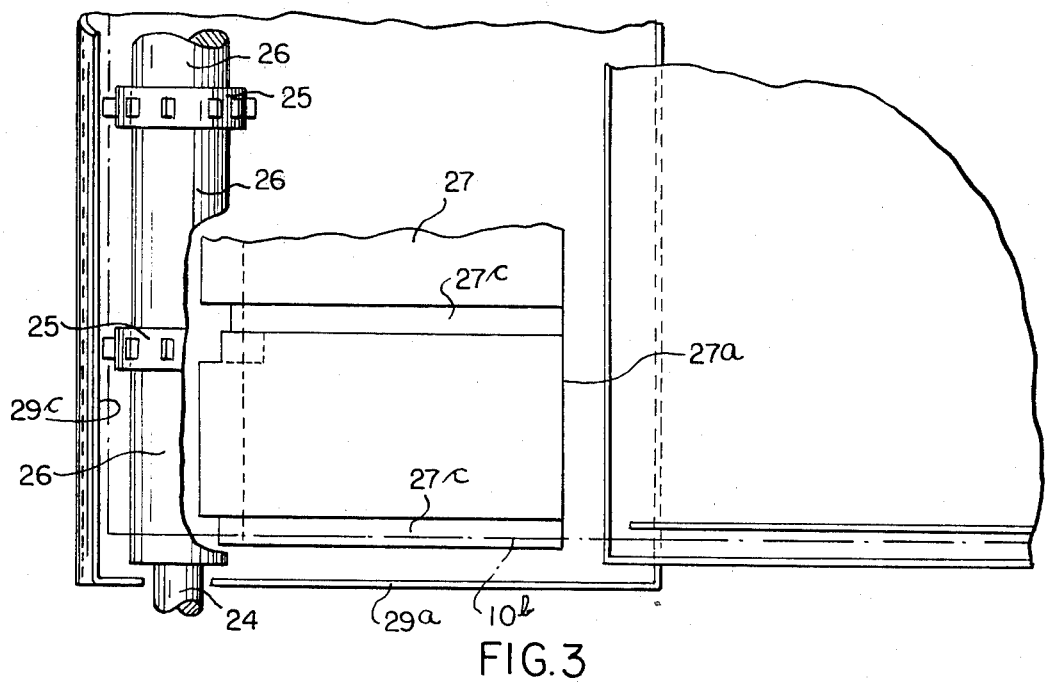
FIG. 3 is a plan view taken along the line 3—3 of FIG. 2.
Figure 4:
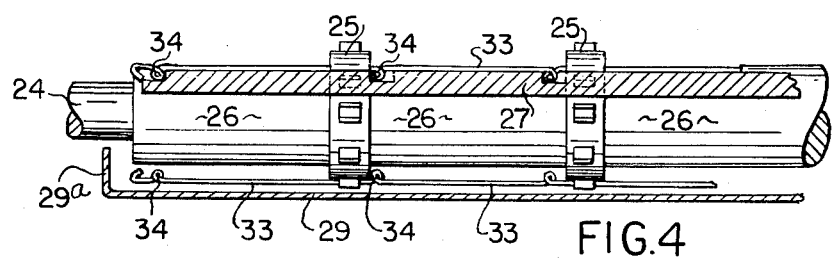
FIG. 4 is a cross-sectional view taken along the line 4—4 of FIG. 2.

Referring to FIGS. 2, 3 and 4, the rear batter flow is shown as added to the left end of the typical batter applicator just described. All of the additions are in the feed area of the belt, both product receiving run and return run. The drive shaft arrangement is different, in that the drive shaft 24 has spaced sprockets 25 attached to it and the normal spaces between the sprockets are now filled nearly to sprocket root diameter with filler spools 26, which will be discussed later. The batter retaining plate 27 has been added under the left end of the product receiving run 10b of the belt, and has the secondary functions of belt support in this area to eliminate any need for slide bars, and directional change support 27a which eliminates the usual first cross rod in the standard applicator. The batter paddle pan 12 and batter overflow trough 23 may both be closer to the feed end. Under the return side of the belt, a new pulley equivalent 28 has been added to give belt support and to change belt direction to horizontal. A new batter holding pan 29 has been added having parallel sides 29a, to form a trough or reservoir supplying the pumping action of the belt.

Figure 6:
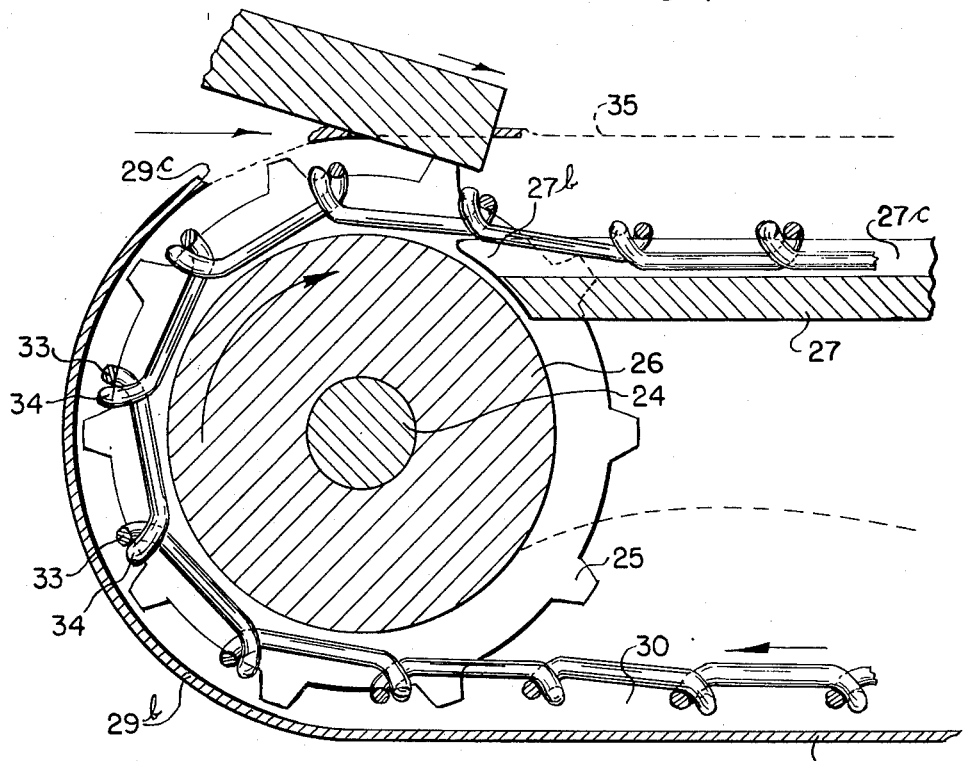
FIG. 6 is a greatly enlarged view of a portion of FIG. 2.

Referring to FIGS. 2, 3, 4 and 6, these changes appear in more detail. In FIGS. 2 and 6 the machined leading edge 27b of the batter retaining plate 27 is shown in close proximity to the periphery of the filler spools between sprockets. The leading edge then acts as a scraper to remove most batter from the drive shaft assembly. The batter retaining plate is thick enough to permit the fabrication of belt hinge clearance slots 27c as is evident in FIGS. 3 and 4, and of a material affording good wear characteristics, while being acceptable for direct contact with food. High density linear polyethylene is the preferred material, although other materials may be suitable. The trailing edge 27a of the plate 27 becomes the point in the belt run where directional change into the batter puddle pan takes place, eliminating the need for a cross rod at that point.

The batter holding pan 29 performs several functions. Firstly, it receives the batter supply which falls through the upper run 10b of the product belt. It then retains the batter in close proximity to the underside of the return run of the belt at 30 so that a minimum can leak past the underside of the belt and return to the sump. This assists the belt in continually moving batter to the underside of the drive shaft assembly, which forms the suction area of the pumping action. The pan is then smoothly curved upwardly around the outside of the drive shaft assembly, leaving clearance for sprocket teeth, to a point on an arc above the horizontal center line of the drive shaft assembly, which will be discussed later. Two controlled openings, the first being the horizontal transverse slot 31 between the batter retaining plate and the batter puddle pan, and the second 32 being the horizontal transverse slot between the batter puddle pan and the upstream edge of the batter holding pan, both assist in maintaining an adequate supply of batter on top of the batter holding pan 29. Means may be provided to vary the width of these slots, such as an adjustable horizontal plate 31a across the end 27a of plate 27, and an adjustable vertical plate 32a across the width of pan 29.

The smooth curve 29b of the batter holding pan starts at a zone immediately below drive shaft 24 and extends partly around the drive shaft assembly with a clearance of about one-eighth inch from the sprocket teeth and terminating at a point 29c above the horizontal centerline of the shaft. It is easily understood that if the termination edge were too low, a considerable amount of the batter pumped to that point would run over the termination edge by gravity to the outside of the curve. This condition is of no benefit in processing and is avoided. It may also be understood that if the pan arc is continued to the vertical center line of the drive shaft assembly, product transfer problems can begin and that cleaning problems increase. Further, it may be understood that higher belt speeds will tend to carry more of a thinner batter to the batter retaining plate from a given termination edge than will lower speeds. Finally, when belt speed is fixed and termination edge is fixed, more thick batter would be carried to the batter retaining plate than thin batter. Thus, the termination edge must be positioned to give the best performance over a range of speeds and a range of batter viscosities, while not interfering with product transfer to the receiving belt nor adding significantly to cleaning problems. The termination point of the arc has been determined to be about 55° to 60° above the horizontal center line of the drive shaft assembly. This has been shown to be suitable for a batter viscosity range of 80 centipoises to 360 centipoises, and a belt speed range of 15 feet per minute to 80 feet per minute.

FIG. 3 shows in plan view how the leading edge of the batter retaining plate must be notched for clearance around sprocket teeth on the drive shaft assembly. FIG. 4 shows how the upper surface of the batter retaining plate is grooved at 27c for the hinge joints of the preferred form of the open mesh wire conveyor belt, the relation of the batter holding pan sides 29a to belt edges and drive shaft assembly ends, and the general appearance of the invention from the line 4—4 of FIG. 2.

Figure 5:
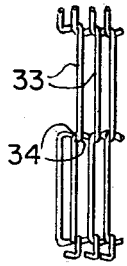

FIG. 5 shows a small portion of the open mesh wire belt preferred for conveyor belt 10. This is made under the trade name "Flat-Flex" by the Wire Belt Company of America. This belt has a plurality of spaced generally parallel wires 33 extending crosswise of the belt with interlocking hinge convolutions 34 connecting adjacent cross wires. Other similar conveyor belts may be used in this invention.

Also evident in FIG. 4 is the construction of the drive shaft assembly. The drive sprockets 25 are shown in their normal driving position for this preferred form of open mesh wire conveyor, as used in the standard batter applicator. The normal space between sprockets is filled by cylindrical spools 26 of small diameter than sprocket root diameter. Thus the drive shaft assembly is effectively a complete cylinder of sprocket root diameter, with sprocket teeth protruding at desired drive points, and with belt hinge clearance below root diameter.

The pumping action of the wire belt of this invention has been mentioned several times. This is best understood by referring to FIG. 6. The drive shaft assembly has been described as essentially a continuous cylinder broken only by protruding sprocket teeth. When the product belt is in place on the drive shaft assembly, the belt hinge points are below the sprocket root diameter, in the annular space allowed by the smaller diameter filler spools 26, and the cross wires 33, 34 of the belt form longitudinal fins between the surface of the filler spools and the inner surface of the upwardly curving arc 29b. The fin effect is clearly seen in FIG. 6. This configuration bears a resemblance to a vane type pump, in that the upwardly curving arc 29b could be compared to the pump housing, the filler spools 26 could be compared to the pump rotor, and the belt cross wires 33 could be compared to the pump vanes. The individual pumping chambers are not as well defined as in a vane type pump because the belt cross wires do not bridge the gap between upwardly curving arc and drive shaft assembly, as do the vanes of the pump. However, the apparent drawback to the pumping action of the built in clearances is partially overcome by the viscosity of the batter. When the drive shaft rotates in the clockwise direction shown in FIGS. 2 and 6, the individual drive chambers pump the batter in the same direction. The presence of the wires as fins serves to shear the batter between the wires and the inner surface of the upwardly curving arc, while the batter between the drive shaft assembly and the wires is essentially held there by the viscosity of the batter. It may be easily understood that the higher the batter viscosity, the less slippage of the inner annular ring of batter. Conversely, with thin batter, less than about 80 centipoises, slippage will increase in the ring. The formation of bare spots is not usually a problem with thin batter.

FIGS. 2 and 6 also show how the batter sheet on top of the batter retaining plate 35 is above the level of the top of the wires forming the product carrying belt. This occurs because the thickness of batter from the surface of the drive shaft assembly to the outside surface of the wires on the shaft assembly is thicker than the distance from the batter retaining plate to the upper surface of the belt cross wires on the retaining plate. Thus, the wires become embedded further in the layer of batter on the batter retaining plate and a sheet 35 is formed on top of the belt. The effect is slightly enhanced because the belt has a tendency to follow the sprocket curve until peeled off by the batter retaining plate at 27b, which actually produces a slight dip in the belt just downstream of the drive shaft assembly. The batter layer appears to well up through the belt at this point. The leading edge of product first touches the layer in this area, and as the product progresses, the air ejection from under the product progresses as previously described, assisted by the continual upwelling of additional batter.

The suction side of this pumping action is formed at the bottom of the drive shaft assembly. As the return run of the belt moves onto the drive shaft assembly, each succeeding cross wire forms a new pumping chamber. The supply of batter to the suction side at 30 has been previously described.

As the cross wires are carried past the termination edge 29c of the upwardly curving arc of the batter holding pan, the batter viscosity again assists in conveying the batter. Being viscous, it will not run off the upwardly curving top of the drive shaft assembly at the normally used speeds of rotation, and it is carried to the point where the leading edge 27b of the batter retaining plate can scrape most of it off the shaft assembly and onto the top of the plate. In a similar condition to what has been described previously, if the batter were very thin, like skim milk, the tendency for it to run off the top of the drive shaft assembly would be increased.

It will be noted that the batter puddle pan is usually retained in the batter applicator fitted with the present invention, even though bottom coverage with batter is already assured by the present invention. This is because some products which are quite thick cannot be reliably edge coated with a top curtain 21, 22 only. Partial immersion is necessary, coupled with top flow, to insure edge coating of product. The retention of the batter puddle pan insures that the machine will successfully coat both thin and thick products.

The two controlled openings for batter, 31, 32 have been mentioned as maintaining an adequate supply of batter to the batter holding pan. An adequate supply of batter is considered to be when the pumping action at drive shaft 24 is fully supplied. It may be understood that an inadequate supply to the pumping action would result in some batter voids under entering product with resultant danger of bare spots. An over supply would only mean overflow over batter holding pan sides back into the main batter tank. Therefore, the top control slot 31 meters a portion of the flow from the first batter curtain onto the batter holding pan, the rest being diverted into the batter puddle pan. The top slot control is not absolutely necessary when two or more batter curtains are used, for an excess of batter supplied to the batter holding pan will eventually return to the sump. However, the first curtain 31 usually supplies more batter than can be utilized for the rear flow as described in this invention, therefore, diversion of excess to the batter puddle pan may be beneficial there. The lower slot 32 serves to help retain the batter on the holding pan. This slot may be fixed in height or may be adjustable either by moving the edge of the batter puddle pan up or down, or by a movable plate 32a, acting as a dam above the return run of the belt. As may be seen in FIG. 2, the bubble trapping area has been eliminated by this invention so that air may freely flow out from under the product. In fact, as seen in FIGS. 2 and 6, product contact with batter takes place on a line transverse to the product. The line progresses from the leading edge of the product to the trailing edge, sweeping the air from under the product as the product advances. It may be seen that the present invention thus eliminates a problem of reliable bottom coating with intermediate viscosity batter. Thin batter presents little problem with bare spots because bubbles easily wash out when product dips into the batter puddle pan. Thick batter application to the bottom of product is obtained with well known "tempura" applicators. The intermediate range of batters may now be applied in a reliable coating on the bottom surfaces of food product, without bare spots, utilizing the present invention.

There are a number of variations which could be built into the present invention without detracting from its spirit. The batter holding pan may be longer or shorter, or slightly angled up or down. The batter supply to the batter holding pan could be directly from the batter circulating pump via piping and a distribution manifold. The drive shaft assembly could be fabricated from a solid piece of acceptable material rather than being an assembly of components. The term "filler spools" in the claims is intended to include this equivalent. The filler spools could be shaped to be closer to or further from the sprocket root diameter, as long as provision is made for the belt hinge points on the shaft assembly. The upwardly curving arc of the batter pan could be closer to the cross wires of the belt, and the termination edge could be made adjustable. The batter retaining plate could be formed of metal with adequate slide provision on the trailing edge, or it could be fabricated from several synthetics other than the preferred material. The controlled slot opening 31, 32 configuration can take numerous forms. A different product belt could be used, other than the preferred type of open wire mesh. Many such variations are possible by those skilled in the art, but none detract from this invention.

What is claimed is:

1. A food batter applicator for batters of intermediate viscosities between about 80 and about 360 centipoises, comprising a frame, an endless open mesh wire conveyor belt having support pulleys on said frame and having a food advancing run from a food-introduction end to a food-discharge end and a return run, a batter reservoir through which said return run passes, a rotatable shaft on said frame having sprocket teeth engaging said belt at said food-introduction end, means on said frame guiding said return run of said belt in a generally horizontal direction for a predetermined distance upstream of said drive shaft, a batter holding pan on said frame closely below said generally horizontal portion of said belt sufficient to hold said batter on said holding pan in driven relation to said belt, said pan having a smoothly bent arcuate portion extending partly around said drive shaft with close clearance of about one-eighth inch about said sprocket teeth from a zone immediately below said drive shaft to a zone about 55° to 60° above a horizontal center line of said shaft, said drive shaft having filler spools between said sprocket teeth filling the diameter of said shaft nearly to the root diameter of said sprocket teeth, a batter retaining plate on said frame generally horizontal extending from a zone tangential to said root diameter at the top of said drive shaft downstream for a predetermined distance, whereby said food-advancing run of said belt travels in contact with said batter retaining plate for said last-named predetermined distance, and means for supplying batter substantially continuously to said batter holding pan.

2. A food batter applicator as defined in claim 1, wherein said conveyor belt is composed of a plurality of spaced generally parallel cross wires extending crosswise of said belt, and interlocking hinge convolutions connecting adjacent cross wires, said convolutions aligned longitudinally of said belt.

3. A food batter applicator as defined in claim 2, including recesses extending longitudinally of said batter retaining plate in position to receive said hinge convolutions permitting said cross wires to substantially scrape said retaining plate.

4. A food batter applicator as defined in claim 1, wherein said means for supplying batter provides a downwardly flowing batter stream above a food product on said food advancing run of said conveyor belt.

5. A food batter applicator as defined in claim 4, wherein said batter stream and said batter retaining plate and said batter holding pan are in vertical alignment, whereby said batter may flow downwardly from said stream to said plate and to said pan.

6. A food batter applicator as defined in claim 1, including a batter puddle pan in said batter reservoir through which said food advancing run of said conveyor passes, said puddle pan having an end rim edge spaced from the downstream end of said batter retaining plate and there providing a first batter control slot.

7. A food batter applicator as defined in claim 1, including a batter puddle pan in said batter reservoir through which said food advancing run of said conveyor passes, said puddle pan having an end rim edge spaced from the downstream end of said batter retaining plate and there providing a first batter control slot, and means for varying the width of said slot.

8. A food batter applicator as defined in claim 1, including a batter puddle pan in said batter reservoir through which said food advancing run of said conveyor passes, said puddle pan having an end bottom edge spaced above said batter holding pan and there providing a second batter control slot.

9. A food batter applicator as defined in claim 1, including a batter puddle pan in said batter reservoir through which said food advancing run of said conveyor passes, said puddle pan having an end bottom edge spaced above said batter holding pan and there providing a second batter control slot, and means for varying the width of said second batter control slot.

10. A device for enhancing the complete coating of the bottom of flat food portions with batters of intermediate viscosity between about 80 and about 360 centipoises, said device being part of a standard type of batter applicator so as to provide a continuous moving layer of batter to receive food portions for coating, said standard type of batter applicator comprising a frame, an endless open mesh wire conveyor belt having support pulleys on said frame and having a food advancing run from a food-introduction end to a food-discharge end and a return run, and a batter reservoir through which said return run passes; said device including a rotatable drive shaft on said frame having sprocket teeth engaging said belt at said food-introduction end, means on said frame guiding said return run of said belt in a generally horizontal direction for a predetermined distance upstream of said drive shaft, a batter holding pan on said frame closely below said generally horizontal portion of said belt sufficient to hold said batter on said holding pan in driven relation to said belt, said pan having a smoothly bent arcuate portion extending partly around said drive shaft with close clearance of about one-eighth inch about said sprocket teeth from a zone immediately below said drive shaft to a zone about 55° to 60° above the horizontal center line of said shaft, said drive shaft having filler spools between said sprocket teeth filling the diameter of said shaft nearly to the root diameter of said sprocket teeth, a generally horizontal batter retaining plate extending from a zone tangential to said root diameter at the top of said drive shaft downstream for a predetermined distance, said food-advancing run of said belt being held by gravity in contact with said batter retaining plate while traveling for said last-named predetermined distance, and means for supplying batter substantially continuously to said batter holding pan, whereby said generally horizontal portion of said return run may continuously move said batter on said batter holding pan to said zone immediately below said drive shaft and the portion of said belt on said drive shaft may move said batter in the direction of rotation from said zone immediately below said drive shaft to said zone tangential to said root diameter at the top of said drive shaft and said batter retaining plate may continuously scrape said batter from the surface of said filler spools to form said continuous moving layer of batter on said retaining plate.

* * * * *